April 21, 1959     H. BLACKSTONE     2,882,783
RADIANT ENERGY GROUND-CLEARANCE METER
Filed Feb. 10, 1955
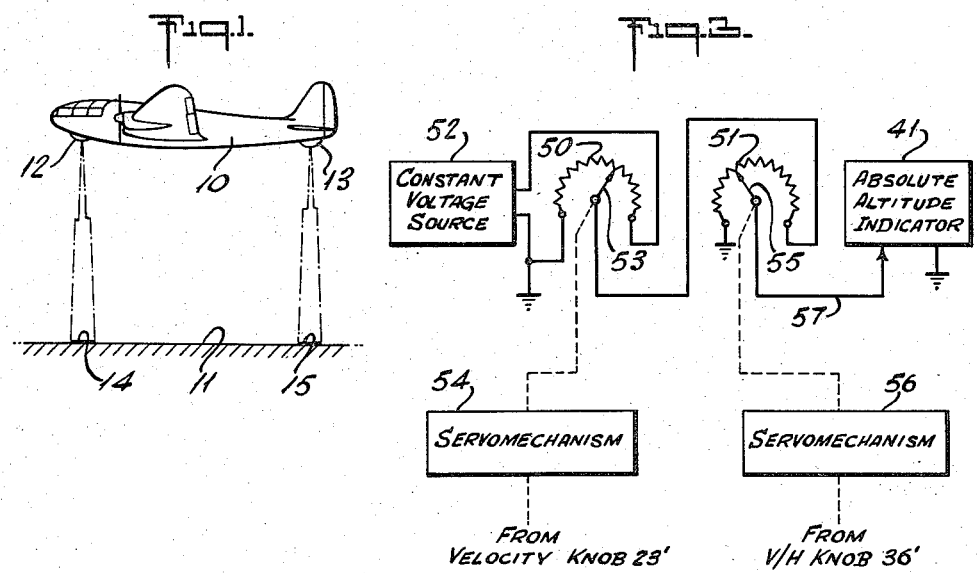
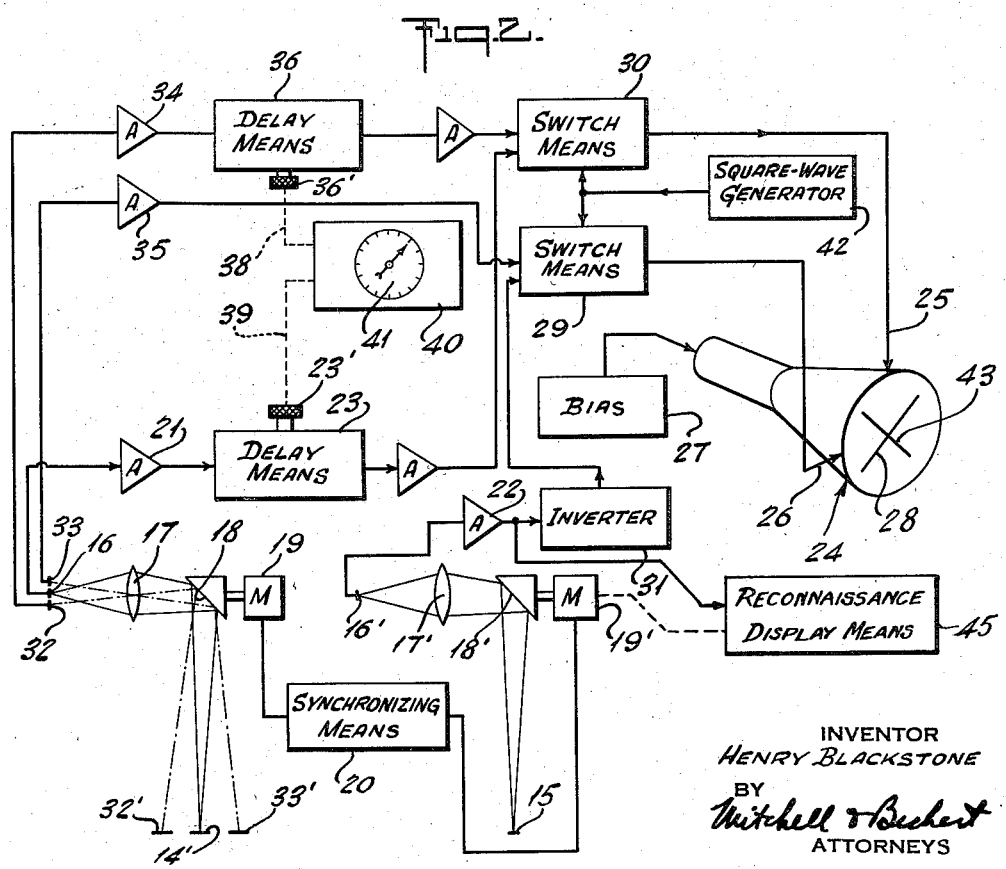
INVENTOR
HENRY BLACKSTONE
BY
ATTORNEYS United States Patent Office 2,882,783
Patented Apr. 21, 1959

2,882,783
RADIANT ENERGY GROUND-CLEARANCE METER

Henry Blackstone, Northport, N.Y., assignor to Servo Corporation of America, New Hyde Park, N.Y., a corporation of New York Application February 10, 1955, Serial No. 487,359

13 Claims. (Cl. 88—1)

My invention relates to an airborne absolute altimeter and is particularly concerned with means not requiring active radiation from the aircraft in order to derive absolute-altitude or ground-clearance data.

It is an object of the invention to provide an improved device of the character indicated.

It is another object to provide a totally passive absolute altimeter.

It is also an object to meet the above objects with a device capable of night-time operation.

It is a general object to achieve the above objects with relatively compact structure which may, and preferably is, also part of other equipment required by the aircraft, as for example part of reconnaissance-data-recording equipment of the type described in copending patent application, Serial No. 320,272, filed November 13, 1952, in the names of Henry Blackstone and Frank J. Willey.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a simple diagram representing a fragmentary side view in elevation of an aircraft flying over terrain scanned by equipment of my invention;

Fig. 2 is a view schematically indicating mechanical, optical, and electrical components of a scanner and computer incorporating features of the invention; and Fig. 3 is an electrical block diagram of a component illustrated in Fig. 2.

Briefly stated, my invention contemplates an entirely passive absolute altimeter which in its broadest aspect is a velocity-responsive device so coupled to a velocity-altitude-responsive device as to yield the quotient of their outputs, meaning absolute altitude. For basic operation, both the velocity-responsive device and the velocity-altitude-responsive device may incorporate energy-responsive elements and optical means imaging these elements in particular relation on the ground over which the aircraft is flying. In the particular arrangement shown, I combine optical systems used for the velocity-responsive device and for the velocity-altitude-responsive device. In both devices, I employ correlating means including means for variably delaying the video output of one element with respect to that of the other, and the arrangement is such that the delay necessary to achieve correlation directly reflects the function to be observed. In the particular form shown, I employ a single display device responsive to both correlations.

Referring to the drawings, my invention is shown in application to an aircraft 10 flying over terrain 11 and equipped with passive devices for separately measuring the ground speed (or velocity) of the aircraft and the velocity-altitude function (or v./h. rate) of the aircraft. The velocity-responsive means may be of the type disclosed in copending application, Serial No. 480,255, filed January 6, 1955, in the name of Morris Weiss, and may, in such event, employ separate optical systems mounted in fore and aft blisters 12—13 on the underside of the aircraft, and at as widely longitudinally spaced locations as is convenient. The optical systems 12—13 are preferably responsive on parallel axes in vertical planes longitudinally spaced in accordance with the spacing of blisters 12—13; at 14—15, I suggest the separate ground spots to which the respective elements of the velocity-responsive means instantaneously respond.

More specifically, in Fig. 2, the lead half of the velocity-responsive means is shown to include an energy-responsive element 16 imaged on the ground at 14 by optical means including a focusing element 17 and a mirror 18. The mirror 18 is shown mounted for rotation on the axis of lens 17 and is inclined at substantially 45 degrees to said axis. A motor 19 continuously drives mirror 18 so as to cause the image of element 16 continuously to scan the terrain transversely of the aircraft, the rotation axis of mirror 18 being thus preferably aligned with the flight axis. In like manner, the rear or aft half of the velocity-responsive means may comprise similar scanning elements, which are therefore given the same reference numerals as already identified for the lead or fore half, but with primed notation.

Synchronizing means 20 is shown in controlling relation with both motors 19—19' in order to assure the development of correlatable video signals representing the outputs of elements 16—16', as developed by suitable pre-amplifiers 21—22. As described in greater detail in said Weiss application, the correlating means may be of the self correcting or auto-correlating variety, or may simply include cathode-ray display means 24 with means for impressing the delayed output of one cell element (16) on one deflection system (suggested at 25) and for impressing the output of the other cell element (16') on the other deflection system (26); delay is effected at 23, as by manipulation of knob 23'. If the deflection systems are perpendicular, and if a steady bias (as provided by source 27) is applied to the grid of the cathode-ray tube 24, then correlation will be recognized by a straight line such as the line 28 inclined intermediate the deflection axes. The delay adjustment at 23 for the lead video signal with respect to the trailing video signal will directly reflect ground speed or velocity, and in the form shown this is noted by the setting of the knob 23'. For purposes which will later be more clear, connections of the video outputs of elements 16—16' to display means 24 proceed through switch means 29—30 and through inverter means 31.

As indicated generally above, the velocity-altitude responsive means may utilize optics in common with the velocity-responsive means, and in the form shown the optical means 17—18 serves both purposes. Thus, in order to derive video signals from which velocity-altitude observations are made. I may employ two further cell elements 32—33 in the focal surface of optics 17 and so spaced on opposite sides of cell element 16 that the images of elements 32—33 are always spaced on the ground in the sense of the flight axis; this is suggested in Fig. 2 by image spots 32'—33', representing, respectively, the leading and trailing responses derived by cells 32—33.

The outputs of cells 32—33 may be suitably preamplified at 34—35 and applied to correlating means in the manner described for the velocity-responsive means and treated at greater length in my copending patent application, Serial No. 480,436, filed January 7, 1955. Thus, the connection of the video output of the lead cell 32 to the correlator may include delay means 36 having an adjustable control element 36', the adjusted condition or position of which will (at correlation) reflect the velocity-altitude function of the aircraft. I suggest, by dotted lines 38—39, that the settings of the respective delay means 23—36 may be fed to a computer 40 having display, recording, or indicator means 41 for indicating the instantaneous setting of means 23', divided by the instantaneous setting of means 36'; indications at 41 are thus true absolute-altitude indications.

Both correlators may be of the fully automatic variety, or they may be manually adjustable and employ separate cathode-ray displays; in the form shown, they are manually adjustable but a single display means 24 serves to indicate both types of correlation. The switch means 29—30 associated with inputs to the vertical and horizontal deflection systems 25—26 are so controlled by a square-wave generator 42 as alternately to connect velocity-determining video signals to tube 24 and velocity-altitude-determining signals to tube 24. The inverter 31 serves the purpose of applying, to one (26) of the deflection system, one of the video signals (to be correlated) in opposite polarity with respect to the corresponding video signal for the other correlating system. Thus, velocity correlations may appear as straight line 28 upon achievement of correlation, and velocity-altitude correlations may appear as the straight line 43 upon achievement of correlation, the reversed slopes of the lines 28—43 being determined by polarity reversal at inverter 31.

The computer 40 may be one of a variety of forms, and in Fig. 3, I illustrate suitable means for deriving the quotient of the two correlator settings. Essentially, the computer of Fig. 3 comprises first and second potentiometers 50—51. The first potentiometer 50 is connected across a source 52 of constant voltage and includes a pick-off element 53 positioned in accordance with the instantaneous setting of the velocity knob 23', representing the output of the velocity-correlating mechanism; a servomechanism 54 is shown for assuring accurate tracking of pick-off 53 for the setting of knob 23'. The second potentiometer 51 is connected across the pick-off voltage output of the first potentiometer 50, and thus serves to divide the velocity voltage. The pick-off element 55 of the second potentiometer 51 may be directly controlled by the v./h. knob 36', as aided by servomechanism means 56. The output of the second potentiometer in line 57 is a voltage directly reflecting the computed quotient, namely, velocity divided by v./h., or absolute altitude, and may directly control the indicator or display means 41.

It will be seen that I have described an ingenious and relatively simple means for continuously and automatically indicating absolute altitude. My device may be operated in conjunction with existing devices for deriving ground speed and/or v./h. data, and the device lends itself to entirely passive operation. By employing suitable infrared-responsive cells at 16—16'—32—33 and by employing infrared transmitting optics 17—17', the device may also be equally effective for night-time operation. At 45, I suggest a conventional reconnaissance display means, functioning from scanner 16'—18', as in the manner discussed in said Blackstone-Willey patent application Serial No. 320,272; this further suggests how my absolute altimeter may utilize components already in the aircraft.

While I have described the invention in detail for the preferred form shown, it will be understood that modifications may be made within the scope of the invention as defined in the claims which follow.

I claim:

1. An airborne absolute altimeter, comprising velocity-altitude means responsive to velocity-altitude function of the aircraft, velocity-responsive means, and computer means responsive to the outputs of said velocity-responsive means and of said velocity-altitude-responsive means, said computer means being operatively connected to said responsive means to derive the ratio of said two outputs, said ratio being proportional to the absolute altitude.

2. An airborne absolute altimeter, comprising velocity-responsive means, velocity-altitude-responsive means including separate lead and trailing elements responsive to ground-scanned radiation and carried at two locations longitudinally spaced with respect to the flight axis, correlating means including means for delaying the output of the lead element with respect to that of the trailing element, whereby the measured delay may reflect the velocity-altitude function, and computer means responsive to the outputs of said velocity-responsive means and of said velocity-altitude-responsive means at correlation, said computer means being operatively connected to said responsive means to derive the ratio of said two outputs, said ratio being proportional to the absolute altitude.

3. An absolute altimeter, comprising velocity-altitude-responsive means, velocity responsive means including two separate optical systems with associated energy-responsive elements at locations spaced longitudinally with respect to the flight axis and having substantially parallel responses in vertical planes, correlating means including means for delaying the output of the lead system with respect to that of the trailing system, whereby delay necessary to achieve correlation may directly reflect velocity, and computer means responsive both to the delay necessary to achieve correlation and to the output of said velocity-altitude-responsive means, said computer means being operatively connected as aforesaid to derive the ratio of said delay to said output, said ratio being proportional to the absolute altitude.

4. An airborne absolute altimeter, comprising velocity-responsive means including separate energy-responsive elements having parallel responses in vertical planes spaced longitudinally with respect to the flight axis, correlating means including means for delaying the output of the lead system with respect to that of the trailing system, whereby at correlation the delay may directly reflect ground speed; velocity-altitude-responsive means including two energy-responsive elements and optical means separately imaging said elements at spaced locations on the ground, said locations being spaced longitudinally with respect to the flight axis; correlating means including means for delaying the output of the lead element with respect to that of the trailing element, whereby upon achieving correlation with said velocity-altitude-responsive means the delay may directly reflect the velocity-altitude function; and computer means responsive to the delay at said first-mentioned delay means divided by the delay at second-mentioned delay means.

5. The combination of claim 4, in which said velocity-responsive means includes separate optical systems for the elements thereof, one of said separate optical systems being in common with the optical system for said velocity-altitude-responsive means.

6. The combination of claim 4, in which the two energy-responsive elements of said velocity-altitude-responsive means are disposed longitudinally adjacent opposite sides of one of the energy-responsive elements of said velocity-responsive means, whereby a single optical system may serve the energy-responsive elements of said velocity-altitude-responsive means as well as one of the energy-responsive elements of said velocity-responsive means.

7. The combination of claim 4, in which said correlators each include cathode-ray-display means, the separate video outputs to be correlated in each case being respectively applied to perpendicular deflection systems of said display means.

8. The combination of claim 7, in which the cathode-ray-display means for said respective correlators is a single cathode-ray tube, and intermittently operated means for applying the video signals to be correlated for said velocity-responsive means and for said velocity-altitude-responsive means, respectively, in alternation to the deflection systems of said cathode-ray tube.

9. The combination of claim 7, in which the cathode-ray-display means for said respective correlators is a single cathode-ray tube, and intermittently operated means for applying the video signals to be correlated for said velocity-responsive means and for said velocity-altitude-responsive means, respectively, in alternation to the deflection systems of said cathode-ray tube, the polarity of signals applied to one deflection axis for one half of the alternating cycle being reversed from that for the other half of the alternating cycle, whereby correlations for the separate correlating means may be separately observed and identified.

10. An airborne absolute altimeter, comprising velocity-responsive means, velocity-altitude-responsive means, a constant-voltage source, means including a potentiometer connected across said source and having a pick-off element positioned in response to the output of said velocity-responsive means, means including a second potentiometer connected across the pick-off voltage from said first potentiometer and including a pick-off element positioned in response to the output of said velocity-altitude-responsive means, whereby the voltage developed by the pick-off for said second potentiometer may directly reflect absolute altitude.

11. The combination of claim 10, and including display means responsive to the pick-off voltage of said second potentiometer.

12. An airborne reconnaissance device, comprising an optical scanner including an energy-responsive element and means for periodically causing the ground image of said element to traverse a scan line laterally of the flight axis, whereby a first scan-line video signal is developed, a second optical scanner including an energy-responsive element and means for periodically causing the ground image thereof to traverse a scan line laterally of the flight axis and in a plane longitudinally spaced from and parallel to that of said first scanner, two further energy-responsive elements in the focal surface of one of said scanners and so placed on opposite sides of the first-mentioned energy-responsive element thereof as to cause images thereof to scan longitudinally spaced scan lines on the ground, first correlation means responsive to said first two mentioned energy-responsive elements and including means for delaying one video output with respect to another, and second correlation means responsive to said two further energy-responsive elements and including means for delaying one video output with respect to another, whereby said first and second delay means may at correlation respectively yield velocity and velocity-altitude data, for ready computation of absolute altitude.

13. A device according to claim 12, and including computer means responsive to the quotient of the outputs of said delay means.

References Cited in the file of this patent
UNITED STATES PATENTS
2,524,807     Kallmann _____ Oct. 10, 1950